Aug. 9, 1932. G. W. BROGAN 1,871,147
MEANS FOR TESTING BRAKES
Filed Dec. 19, 1927 4 Sheets-Sheet 1

INVENTOR.
Graham W. Brogan
BY
William W. Varney
ATTORNEY

Aug. 9, 1932.  G. W. BROGAN  1,871,147
MEANS FOR TESTING BRAKES
Filed Dec. 19, 1927  4 Sheets-Sheet 2

INVENTOR.
Graham W. Brogan
BY
William W. Varney
ATTORNEY

Aug. 9, 1932.   G. W. BROGAN   1,871,147
MEANS FOR TESTING BRAKES
Filed Dec. 19, 1927   4 Sheets-Sheet 3

INVENTOR.
Graham W. Brogan
BY William W. Varney
ATTORNEY

INVENTOR.
Graham W. Brogan
BY
William W. Harney
ATTORNEY.

Patented Aug. 9, 1932

1,871,147

UNITED STATES PATENT OFFICE

GRAHAM W. BROGAN, OF TOWSON, MARYLAND, S. DUNCAN BLACK AND THE SAFE DEPOSIT AND TRUST COMPANY OF BALTIMORE, EXECUTORS OF SAID GRAHAM W. BROGAN, DECEASED, ASSIGNORS TO WILLIAM W. VARNEY, OF BALTIMORE, MARYLAND

MEANS FOR TESTING BRAKES

Application filed December 19, 1927. Serial No. 241,148.

The object of my invention is an improved method of testing and comparing the several brakes on a vehicle, while the same is in motion.

A further object of my invention is the providing of an improved brake-testing device for testing brakes on moving vehicles.

A further object of my invention is the providing of means for testing the respective brakes on a moving vehicle, and ascertaining the relative adjustment thereof.

A further object of my invention is providing a simple brake testing device, portable, or semi-portable, in character, easily assembled and positioned for service.

A further object of my invention is the providing of mutually co-operating contact plates in a brake testing device.

A further object of my invention in a brake testing device is the providing of indicating means for indicating the relative braking effectiveness of the several braking means on the several wheels.

A further object of my invention, is the providing in a brake testing device an indicating positioning means to assist the operator of the vehicle in applying the brakes at the desired location.

A further object of my invention is the providing in a brake testing device a sensitive adjusting means.

With the foregoing and other objects in view, my invention consists of the methods employed, combination and arrangements of systems, apparatus and means as hereinafter specifically provided and illustrated in the accompanying drawings wherein is shown the preferred embodiment of my invention, but it is understood that changes, variations and modifications may be resorted to which come within the scope of the claims hereunto appended.

Figure 1:
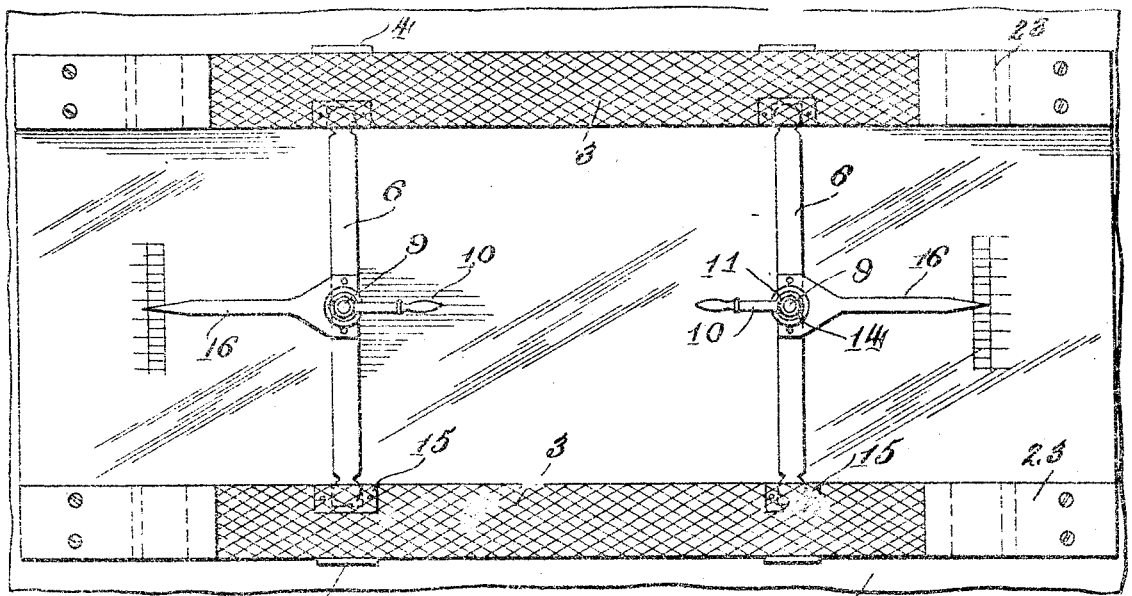
Figure 2:
Figure 3:
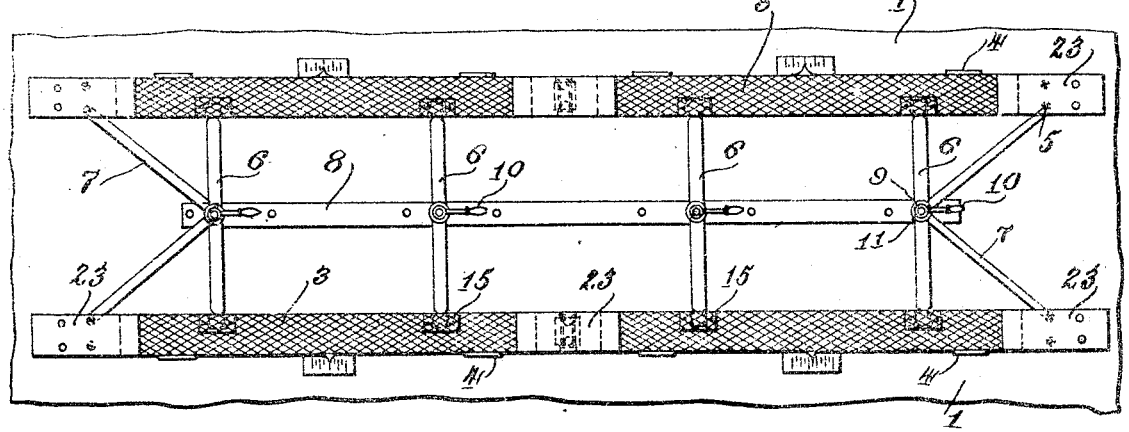
Figure 4:
Figure 5:
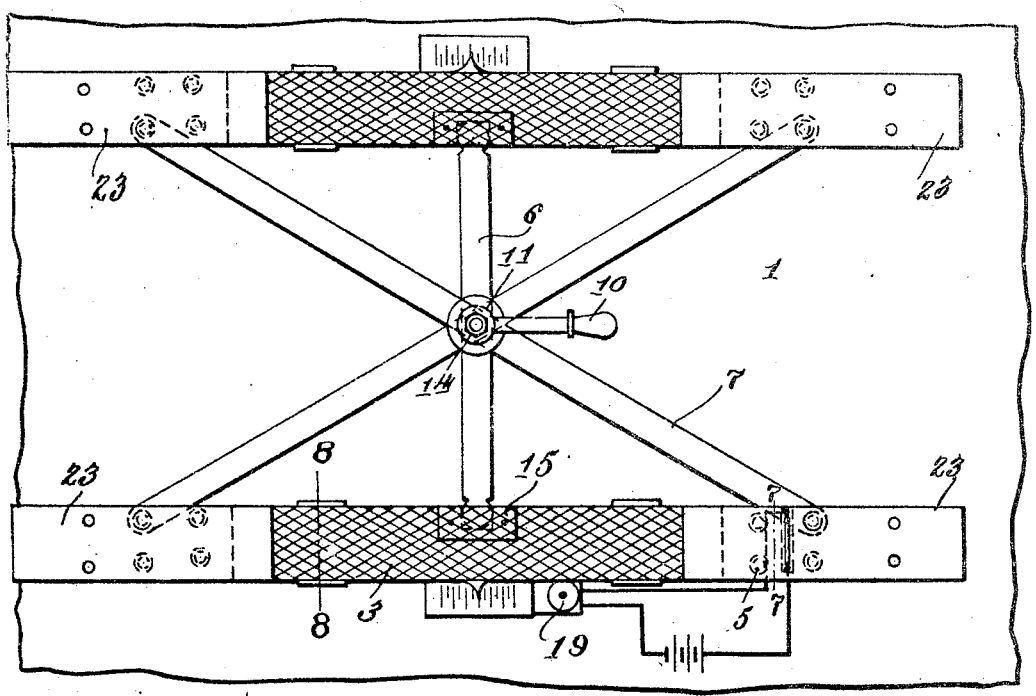
Figure 6:
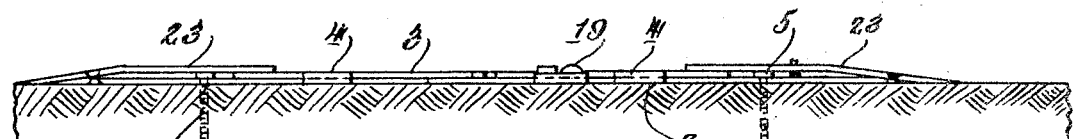
Figure 7:
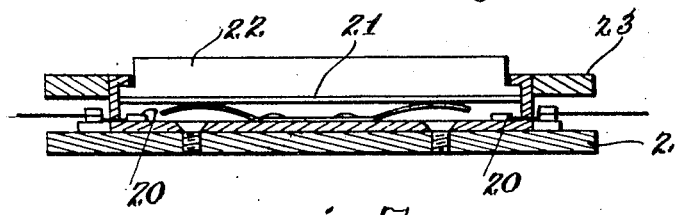
Figure 8:
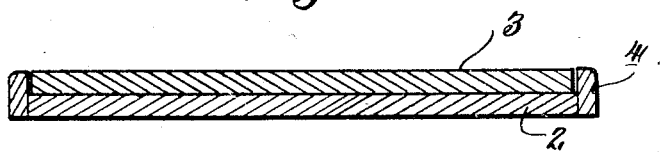
Figure 9:
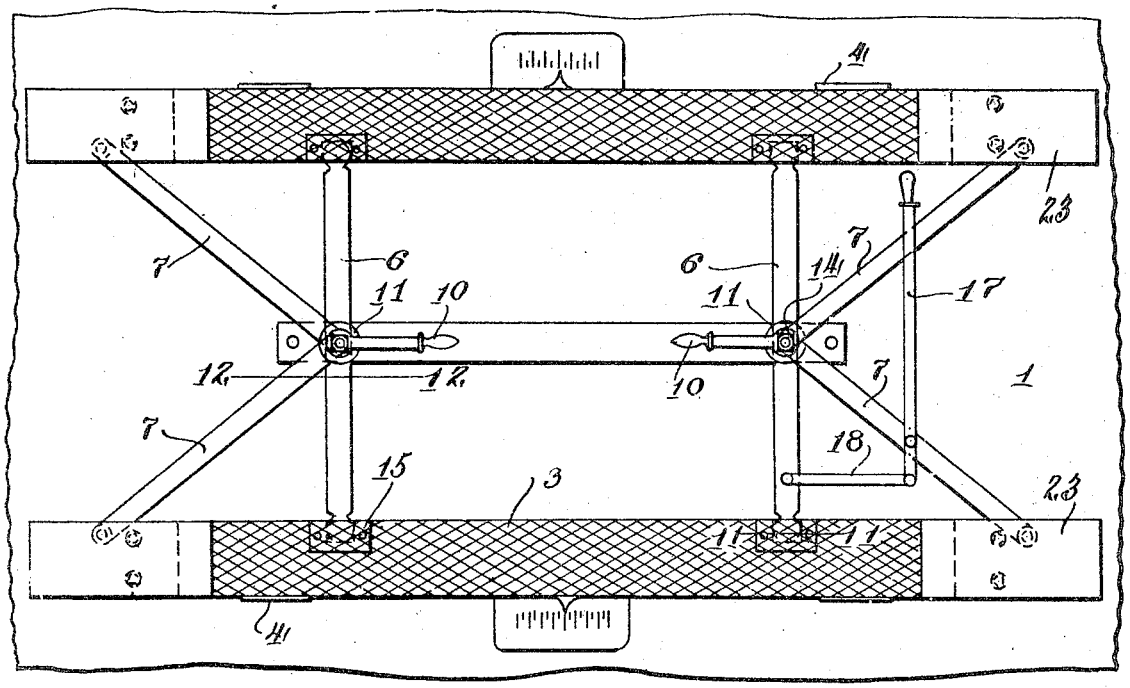
Figure 10:
Figure 11:
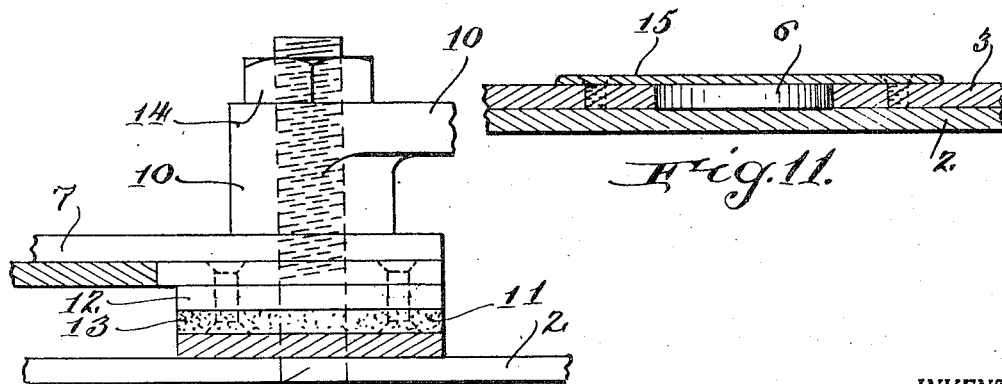
Figure 12:
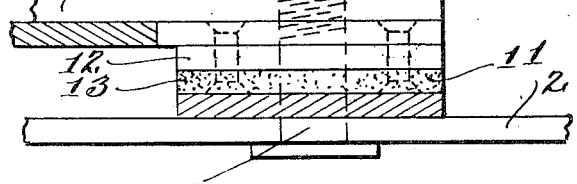
Figure 13:
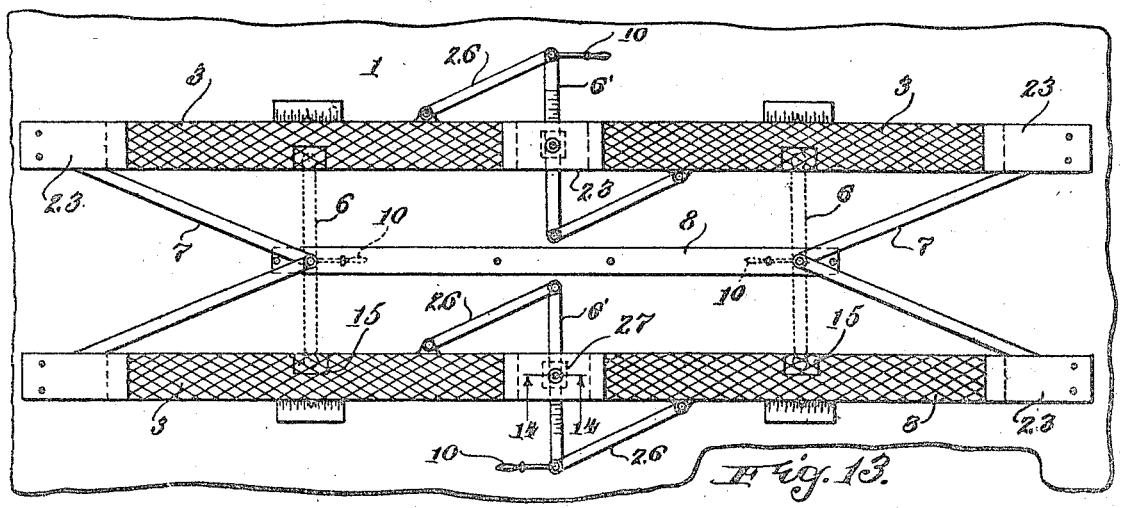
Figure 15:
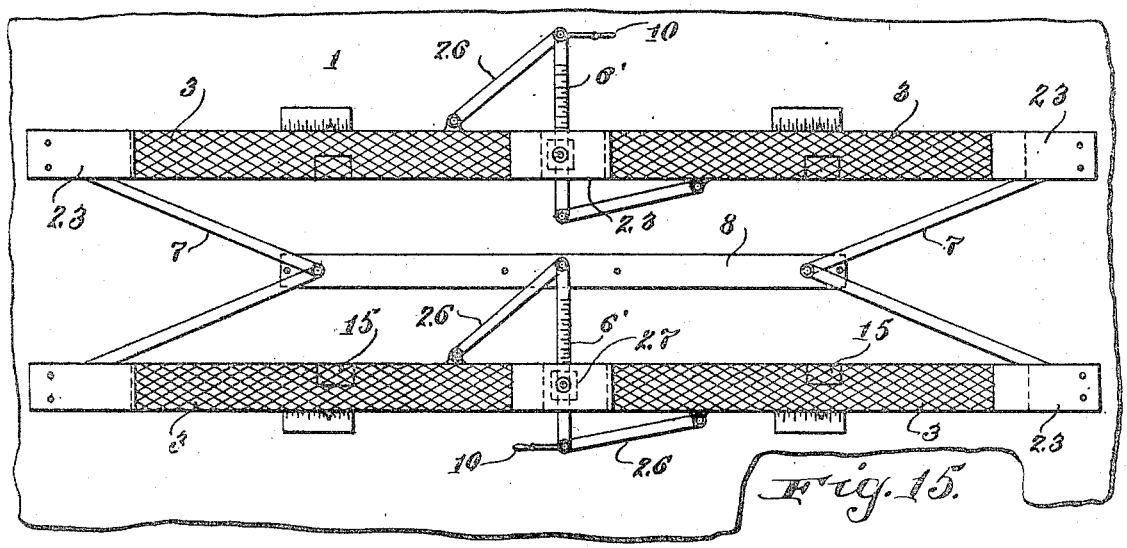
Figure 14:
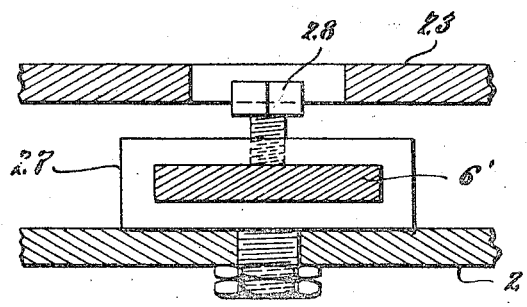

In the drawings of the herein-described embodiment of my invention, Figure 1 is a plan view of a device for carrying out my method of testing brakes on moving vehicles; Fig. 2 is a side view in elevation of the device shown in Fig. 1; Fig. 3 is a plan view of a modified form of my device for testing all four brakes of a vehicle simultaneously; Fig. 4 is a side view in elevation of the device shown in Fig. 3; Fig. 5 is a plan view of another modification of a device for carrying out my method of brake testing; Fig. 6 is a side view in elevation of the device shown in Fig. 5; Fig. 7 is a sectional view, taken through 7—7 of Fig. 5, showing an electric circuit closing means for operating the annunciator, or indicating means, for showing the location of the vehicle at a predetermined position of the same; Fig. 8 is a sectional view taken through 8—8 of Fig. 5; Fig. 9 is a plan view of another modification of my brake testing device; Fig. 10 is a side view in elevation of the device shown in Fig. 9; Fig. 11 is a sectional view, taken through 11—11 of Fig. 9; Fig. 12 is a view in elevation, partly in section, taken through 12—12 of Fig. 9, particularly showing a means for reducing the sensitiveness of my device; Fig. 13 is a plan view of a modified convertible form of my device for testing the relative effectiveness of the several brakes on a single side of a vehicle, or by conversion may test the opposite brakes as in the other forms shown; the dotted lines in said figure representing the latter type, and the equalizing bar 6, shown in full line, will be disconnected from the contact plates 3; Fig. 14 is a sectional view taken through line 14—14, of Fig. 13 and Fig. 15 is a plan view of the apparatus shown in Fig. 13 after having been adjusted for testing brakes on wheels on the same side of an automobile, say at a ratio of 40 to 60, each side operating independently, the two sliding members on the same side of the automobile being linked together by lever 6¹ and links 26.

Similar numerals refer to similar parts throughout the several views.

1 is the floor, or base, upon which my device is placed, such as, the floor of the garage, a pavement, or any suitable support; it may be of wood, concrete, asphalt, or any other suitable material, or simply earth. 2 is the base plate, on the upper surface of which operates, or slides, contact plate 3. 4 are lugs, or guides, between which contact plate 3 operates. They are secured to base plate 2.

Base plate 2 may simply rest on the floor, or ground, as shown in Fig. 2, or it may be secured to the floor by bolts, pins, or other suitable fastenings 5. Base plate 2 instead of being separated and one under each contact plate as shown in Figs. 2, 5 and 9 may be a continuous bed plate, as shown in Fig. 1, making a convenient, portable form. Contact plate 3 is preferably smooth on its under side, for contacting or sliding on base plate 2; and, on its upper side, is preferably roughened, or provided with a surface to contact with the tire, or wheel, of the vehicle, the brakes of which are to be tested. It is desirable that this surface should have but small slippage in contact with said tire. This surface, while for durability and service may be simply roughened metal, a coating on said metal to provide non-slippage contact with the tire may be provided.

6 are equalizing bars connecting contact plates 3, causing the same to mutually cooperate in the determining of a relative effectiveness of the brakes on the wheels contacting with contact plates 3, respectively. These bars are connected in any convenient method with contact plate 3, as shown, designed to act as a one tooth pinion in a one tooth-rack. These bars being fulcrumed to the base plate as shown in Fig. 1.

Where an open form of base plate 2 is used, as shown in Figs. 3, 5 and 9, 7 are brace bars at one end secured to base plates 2 so as to form a rigid structure of a plurality of the base plates. This may be accomplished as shown in Fig. 5 by extending those bars from base plate to base plate, or, as shown in Figs. 3 and 9, to anchor plate 8.

Any desirable means may be employed to effect the sensitiveness of the sliding contact between base plate 2 and contact plate 3.

I have shown a form which gives satisfaction, and it consists (see Fig. 12) of clamping bolt 9, handle nut 10 operating on said clamping bolt clamping between it and the head of said clamping bolt, brace bars 7, equalizing bars 6 and a friction washer 11, and where there is an anchor plate, also said anchor plate.

Friction washer 11 may be of any suitably constructed washer, all metal, but I prefer a lined washer having a metal portion 12 and a fibre lining 13 secured thereto.

On bolt 9, outside of handle nut 10, I have found it desirable to provide a lock nut 14 to lock the various parts, after the device is adjusted. Where the equalized base 6 operates in contact plate 3, I provide a cover plate 15.

An indicating means for showing the displacement of the contact plates 3 from middle, or neutral, position is shown at 16 as a pointer, over a graduated scale. In the types illustrated in Figs. 5—9, it is on the edge of the contact plates 3. And in the types illustrated in Figs. 1 and 3, the pointers are on the equalizing bars. In the heavier type of device, a replacement means or handle is shown in Fig. 9; 17 being the handle fulcrumed on brace bar 7 operating equalizing bar 6 by means of link 18.

To determine the position of a vehicle being driven on to my device when the brakes should be applied for the testing, an annunciating, or regulating, means is provided. I have shown an electric bell operated by a contact switch located to operate when the wheel of the vehicle is in the desired position. This switch is shown in Fig. 7, and consists of terminals 20 and cross connecting bar 21 joining said terminals when surface plate 22 is depressed by the wheel of the vehicle.

23 are approach, or rider, plates secured to base plate 2 and overlap ends of contact plates 3. These plates prevent a butting contact by the wheel of a vehicle with the contact plates 3. Under rider plates 23 are stops 24 limiting the movement of contact plates 3. In the device shown in Fig. 1 a rivet is used and in the cases shown in Figs. 3, 5 and 9, the fastenings 5 perform this function. The device shown in Fig. 3 tests the front wheels and the rear wheels simultaneously and determines which opposite brakes are out of adjustment, if at all. See the form of my device shown in Fig. 13 for comparing the brakes on a single side of a vehicle.

My methods employed in testing automobile brakes is to determine simultaneously the relative holding power of brakes on the opposite sides of a vehicle, or on the same side of a vehicle respectively while said brakes are subjected to friction in motion.

In the practice of my process and the utilization of the device described, as an illustration I will take an automobile, provided with four-wheel brakes, and drive it on to the device as shown in Figs. 3 and 4, applying the brakes at a predetermined point as announced by the ringing of the annunciator bell, upon the vehicle wheel pressing the surface plate 22, which is not shown in Fig. 3 for the lack of space, but is relatively positioned as shown in Fig. 5 to the contact plate 3.

The wheels go on to contact plates 3. If both brakes allow the wheels to turn with equal resistance the contact plates will remain stationary and no relative displacement of these plates takes place. If, however, one brake holds tighter than the other the wheels controlled thereby will tend to slow up quicker than the other wheels, thus causing a relative displacement of the contact plates under the wheels being tested. This will be indicated by an indicating means.

The wheels may be the both front wheels and both back wheels, if being tested on the device shown in Fig. 3. If being tested on the device shown in Fig. 13 and Fig. 15, it will show the difference between the front and the rear brake on either side of the machine, and then by testing the brakes on the other modification, all four brakes may be compared.

My device may be used in a runway, or on the road, for testing and comparing brakes, without stopping the vehicle, by simply momentarily applying the brakes while the driving power of the machine is released and the wheels are under control of the brakes, while on said device. This, of course, in the device shown only applies to the wheels last in contact with the same.

When the brakes on one side of the vehicle are to be tested, that is, the front and rear brake compared, the device shown in Fig. 13 is used. As a different ratio of holding effect of the respective brakes is usual, say, for instance, the ratio of forward to rear brake being 40% to 60%, that requires a means on the device for regulation to show the desired ratio of holding effect between the brakes tested; this regulation is accomplished in the drawing shown by changing the location of the fulcrum of the equalizing bar 6', as shown, by means of block 27 through which said equalization bar 6' may be adjusted and securing means 28 for holding the equalizing bar in desired fulcrumed position.

Having thus described my invention, what I claim and desire to secure by Letters Patent is:

1. A brake testing device consisting of, a plurality of relatively movable surface plates over which the wheels of a vehicle the brakes of which are to be tested are respectively driven, means mutually controlling said plates whereby the relative movement of said plates must be in opposite directions.

2. A brake testing device consisting of, a plurality of relatively movable surface plates over which the wheels of a vehicle the brakes of which are to be tested are respectively driven, means mutually controlling said plates whereby the relative movement of said plates must be in opposite directions, and means indicating the relative position of said plates.

3. A brake testing device comprising a plurality of movable surface plates on which the wheels of a vehicle the brakes of which are to be tested are respectively operated, means to control the movement of said plates whereby the movement of one of said plates causes a movement of another of said plates and means for determining the relative movement of said plates.

4. A brake testing device comprising, a plurality of movable surface plates on which the wheels of a vehicle the brakes of which are to be tested are respectively operated, means for controlling the movement of said plates whereby the movement of one of said plates causes a movement of another of said plates, and means for adjusting the ratio of the relative movements of said plates.

5. A brake testing device comprising, a plurality of movable surface plates on which the wheels of a vehicle the brakes of which are to be tested are respectively operated, means for controlling the movement of said plates whereby the movement of one of said plates causes a movement of another of said plates, and means for adjusting the ratio of the relative movements of said plates consisting of a lever operating said plates from a fulcrum, and means for varying the relative length of said lever arms.

6. A brake testing device consisting of a plurality of relatively movable surface plates over which the wheels of a vehicle the brakes of which are to be tested are respectively driven, means mutually controlling said plates whereby the relative movement of said plates must be in opposite directions, and adjustable means adapted to retard said movement.

GRAHAM W. BROGAN.